(12) United States Patent
Hernandez Cortinas et al.

(10) Patent No.: US 12,500,825 B2
(45) Date of Patent: Dec. 16, 2025

(54) SYSTEMS AND METHODS FOR NETWORK TRAFFIC MONITORING

(71) Applicant: Schweitzer Engineering Laboratories, Inc., Pullman, WA (US)

(72) Inventors: Edson L. Hernandez Cortinas, Pullman, WA (US); Preston Stephens, Moscow, ID (US); Bharat Nalla, Ashburn, VA (US); Mauricio G. Silveira, Pullman, WA (US); Gabriel DeRuwe, Pullman, WA (US); Dennis Holmbo, Spokane, WA (US); David J. Dolezilek, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 18/183,474

(22) Filed: Mar. 14, 2023

(65) Prior Publication Data

US 2024/0098003 A1 Mar. 21, 2024

Related U.S. Application Data

(60) Provisional application No. 63/375,774, filed on Sep. 15, 2022.

(51) Int. Cl.
*H04L 43/0817* (2022.01)
*H04L 43/16* (2022.01)

(52) U.S. Cl.
CPC .......... *H04L 43/0817* (2013.01); *H04L 43/16* (2013.01)

(58) Field of Classification Search
CPC ............................ H04L 43/0817; H04L 43/16
See application file for complete search history.

(56) References Cited

U.S. PATENT DOCUMENTS

| | | |
|---|---|---|
| 5,134,386 A | 7/1992 | Swanic |
| 5,623,601 A | 4/1997 | Vu |
| 5,680,324 A | 10/1997 | Schweitzer |
| 5,793,750 A | 8/1998 | Schweitzer |
| 5,826,014 A | 10/1998 | Coley |
| 5,898,830 A | 4/1999 | Wesinger |
| 6,151,300 A | 11/2000 | Hunt |
| 6,256,592 B1 | 7/2001 | Roberts |
| 6,539,341 B1 | 3/2003 | Li |
| 6,603,748 B1 | 8/2003 | Lu |
| 6,751,562 B1 | 6/2004 | Blackett |
| 6,842,445 B2 | 1/2005 | Ahmavaara |

(Continued)

FOREIGN PATENT DOCUMENTS

WO 2005086418 9/2005

OTHER PUBLICATIONS

Herbert Faulk, MMS Ether-Real Network Analyzer, the Skunk Works.

(Continued)

*Primary Examiner* — Abdullahi E Salad
(74) *Attorney, Agent, or Firm* — Fletcher Yoder, P.C.

(57) ABSTRACT

Systems and methods may be used to assess network communications by generating one or more current communication parameters based on communications at an intelligent electronic device (IED) within an electric power delivery system. Network communications may be assessed by determining, at the IED, whether the communications fall within one or more thresholds for the current communication parameters.

22 Claims, 4 Drawing Sheets

(56) References Cited

U.S. PATENT DOCUMENTS

| | | | |
|---|---|---|---|
| 6,947,269 | B2 | 9/2005 | Lee |
| 7,010,589 | B2 | 3/2006 | Ewing |
| 7,027,896 | B2 | 4/2006 | Thompson |
| 7,376,969 | B1 | 5/2008 | Njemanze |
| 7,552,367 | B2 | 6/2009 | Kasztenny |
| 7,743,198 | B2* | 6/2010 | Haustein ............. H04L 67/1097 710/316 |
| 7,966,659 | B1 | 6/2011 | Wilkinson |
| 9,628,497 | B2 | 4/2017 | Zambon |
| 9,729,568 | B2 | 8/2017 | Lefebvre |
| 9,852,149 | B1* | 12/2017 | Taylor ................. G06F 16/1844 |
| 11,165,802 | B2 | 11/2021 | Tews |
| 2004/0076273 | A1 | 4/2004 | Oman |
| 2004/0208538 | A1 | 10/2004 | Liwak |
| 2005/0138432 | A1 | 6/2005 | Ransom |
| 2005/0280965 | A1 | 12/2005 | Lee |
| 2006/0126596 | A1 | 6/2006 | Shieh |
| 2006/0146996 | A1 | 7/2006 | Oman |
| 2007/0025036 | A1 | 2/2007 | Morris |
| 2007/0089029 | A1 | 4/2007 | Ginzburg |
| 2007/0112446 | A1 | 5/2007 | Deveaux |
| 2008/0075019 | A1 | 3/2008 | Petras |
| 2008/0089277 | A1 | 4/2008 | Alexander |
| 2008/0091770 | A1 | 4/2008 | Petras |
| 2008/0097694 | A1 | 4/2008 | Petras |
| 2009/0296583 | A1 | 12/2009 | Dolezilek |
| 2013/0031201 | A1* | 1/2013 | Kagan .................... G01D 4/004 709/213 |
| 2014/0266736 | A1* | 9/2014 | Cretu-Petra .......... A61B 5/6808 340/573.5 |
| 2014/0269736 | A1* | 9/2014 | Kasztenny ............... H04B 3/54 370/400 |
| 2015/0264073 | A1 | 9/2015 | Tavakoli |
| 2017/0126745 | A1 | 5/2017 | Taylor |
| 2017/0149734 | A1* | 5/2017 | Wallace ................ H04L 63/205 |
| 2017/0288950 | A1* | 10/2017 | Manson .............. H04L 43/0811 |
| 2017/0318053 | A1 | 11/2017 | Singh |
| 2019/0173899 | A1* | 6/2019 | Tews ................... H04L 63/1425 |
| 2023/0066208 | A1* | 3/2023 | Gordon ................ H04L 63/123 |

OTHER PUBLICATIONS

Giovanni Vigna, Andrew Mitchell, Mnemosyne: Designing and Implementing Network Short-Term Memory, Reliable Software Group, University of California, Santa Barbara, Proceedings of the Eighth IEEE International Converence on Engineering of Complex Computer Systems (ICECCS '02) 1050-4729/02, 2002.

Richard Sharpe, Ed Warnicke, Ulf Lamping, Ethereal User's Guide, V2.0.2 (15685) for Ethereal 0.10.12, 2005.

David Plonka, Andres Jann Tack, "An Analysis of Network Configuration Artifacts" Presented at 23rd Large Installation System Administration Conference, Baltimore, MD. Nov. 2009.

Paula Doyle, "Introduction to Real-Time Ethernet I" The Extension, vol. 5 Issue 3, May 2004.

Paula Doyle, "Introduction to Real-Time Ethernet II" The Extension, vol. 5 Issue 4, Jul. 2004.

Cathy A. Fulton, San-Qi Li, "Delay Jitter First-Order and Second-Order Statistical Functions of General Traffic on High-Speed Multimedia Networks" IEEE/ACM Transactions on Networking, vol. 6, No. 2, Apr. 1998.

Upeka Premaratne, "Empirical Network Jitter Measurements for the Simulation of a Networked Control System" 2014 International Conference on Advances in ICT for Emerging Regions, Dec. 2014.

Marek Szmechta, Pawel Aksamit, "Modeling Packet Delay Distributions in an Industrial Telemetry System" 5th International Symposium on Computational Intellifence and Intellifent Informatics, Sep. 2011.

Tingting Hu, Ivan Cibrario Bertolotti, "Overhead and ACK-Induced Jitter in Modbus TCP Communication" 2015 IEEE 1st International Forum on Research and Technologies for Society and Industry Leveraging a better tomorrow (RTSI). Nov. 2015.

Jason But, et al., "Passive TCP Stream Estimation of RTT and Jitter Parameters" The IEEE Conference on Local Computer Networks 30th Anniversary, Nov. 2005.

L. Rizo, et al. "Cauchy Distribution for Jitter in IP Networks" 18th International Conference on Electronics, Communications and Computers, Mar. 2008.

L. Rizo, et al. "Packet Variation Delay Distribution Discrimination Based on Kullback-Leibler Divergence" 2010 IEEE Latin-American Conference on Communications, Sep. 2010.

Pradhumna L. Shrestha, et al., " A Novel Analytical Model and its Test Bed Verification for Network Convert Timing Channels" 2015 IEEE Conference on Communications and Network Security, Sep. 2015.

Lei Qian, Brian E. Carpenter "Some Observations on Individual TCP Flows Behavior in Network Traffic Traces" The 11th International Symposium on Communications & Information Technologies, Oct. 2011.

David Murray, Terry Koziniec "The State of Enterprise Network Traffic in 2012" 18th Asia-Pacific Conference on Communications (APCC), Oct. 2012.

Robert Rawlyk "Ethernet and Implementation in Automation" Beckhoff Automation LLC, Burnsville, MN, Mar. 2005.

Federico Simmross-Wattenberg, et al., "Anomaly Detection in Network Traffic Based on Statistical Inference and _ Stable Modeling" IEEE Transactions on Dependable and Secure Computing, vol. 8, No. 4, Jul. 2011.

Li Zheng, et al., "Characteristics of Network Delay and Delay Jitter and its Effect on Voice over IP (VoIP)" IEEE International Conference on Communications, Jun. 2001.

Galil Motion Control "Evolution of Ethernet in Control Systems" Jan. 2014. Retrieved from http://www.galilmc.com/news/ethernet.

"Overview to recent advances in Ethernet used in industrial IO communication networks" May 2003. Retrieved from https://www.google.com/url?sa=t&rct=j&q=&esrc=s&source=web&cd=1&cad=rja&uact=8&ved=2ahUKEwjfoN-Sy8biAhWHVN8KHdroDeYQFjAAegQIBRAC&url=https%3A%2F%2Fpdfs.semanticscholar.org%2Fae2e%2Fa2347573473f2fe6f354a6434a72a0eb50c4.pdf&usg=AOvVaw0gpRDFGfF7cTBhbudTgGB3.

* cited by examiner

SYSTEMS AND METHODS FOR NETWORK TRAFFIC MONITORING

RELATED APPLICATIONS

This application claims the benefit under 35 U.S.C. § 19(e) to U.S. Provisional Application No. 63/375,774, filed 15 Sep. 2022, and entitled "Systems and Methods for Network Traffic Monitoring," which is incorporated herein by reference in its entirety for all purposes.

BACKGROUND

This disclosure generally relates to monitoring network traffic. More particularly, this disclosure relates to monitoring network traffic using intelligent electronic devices.

Electric power delivery systems are designed to generate, transmit, and distribute electric energy to loads. Electric power delivery systems may include equipment such as electric generators, electric motors, power transformers, power transmission and delivery lines, circuit breakers, switches, buses, voltage regulators, capacitor banks, and the like. The equipment may be monitored, controlled, automated, and/or protected using intelligent electronic devices (IEDs) that receive electric power delivery system information from the equipment, make decisions based on the information, and provide monitoring, control, protection, and/or automation outputs to the equipment. Accordingly, the IEDs may provide network communications to facilitate communications between IEDs and the equipment. The IEDs may be configured to operate according to one or more communications protocols.

However, these IEDs may be subject to faults or failures for various reasons. For example, the IEDs may be targets of security attacks and/or may undergo configuration changes (e.g., changes to network and/or changes to devices in the network) without suitable compensation for the changes. Accordingly, techniques for monitoring network traffic using the IEDs may help identify security attacks and predict and prevent faults or failures.

DETAILED DESCRIPTION

One or more specific embodiments will be described below. When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

A monitoring system for monitoring industrial communications systems may determine a status of the communications system. Such monitoring may determine an occurrence of a security event, communications stresses, and/or the like. To facilitate network assessment, characteristics of network traffic may be monitored. For example, a deviation from expected characteristics may indicate a cybersecurity attack, network loops, multicast and/or broadcast storms, an unbalanced network, a change in topology, an equipment addition or removal, abuse of routing tables, a compromise of firmware, and/or other interesting events that may be used in an attempt to adversarially compromise system operation. As used herein, a "cybersecurity attack" may refer to any suitable technique that attempts to access, alter, and/or disrupt data, communications, and/or devices within a communications network. For example, a network flooding attack may include transmission of a very high volume of network traffic (e.g., data packets) to a communications network that prevents the communications network from examining and/or allowing permitted network traffic. The generic object oriented substation event (GOOSE) communication protocol may be utilized by intelligent electronic devices (IEDs) to group any number of data formats (e.g., statuses, values) into a data set for transmission via a communications network. A spoofing attack may include transmitting and/or providing false messages or data sets, such as a GOOSE message, in a communications network. A replay attack may include receiving and/or intercepting authentic messages or data sets by an unauthorized party or device and retransmitting and/or delaying the authentic messages. A media access control (MAC) attack may include providing numerous Ethernet frames to a switch in the communication network in order to force out authentic MAC addresses stored in memory of the switch. A denial-of-service (DoS) attack may include temporarily or indefinitely disrupting communications between one or more devices within a communications network by overloading targeted devices with messages or data sets. As use herein, a "network abnormality" may refer to any cybersecurity attack, deviation from threshold parameters, and/or network inefficiencies or misconfigurations. Additionally, the term "set" may include one or more. That is, a set may include a unitary set of one member, but the set may also include a set of multiple members. Furthermore, as used herein, a set may include a portion (e.g., a subset, all) of data and/or information. While the data is described herein as including two data sets or three data sets, this is intended to be illustrative of certain embodiments. As such, the data may include any suitable number of data sets (e.g., two data sets, three data sets, four data sets, eight data sets, and so forth).

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Figure 1:
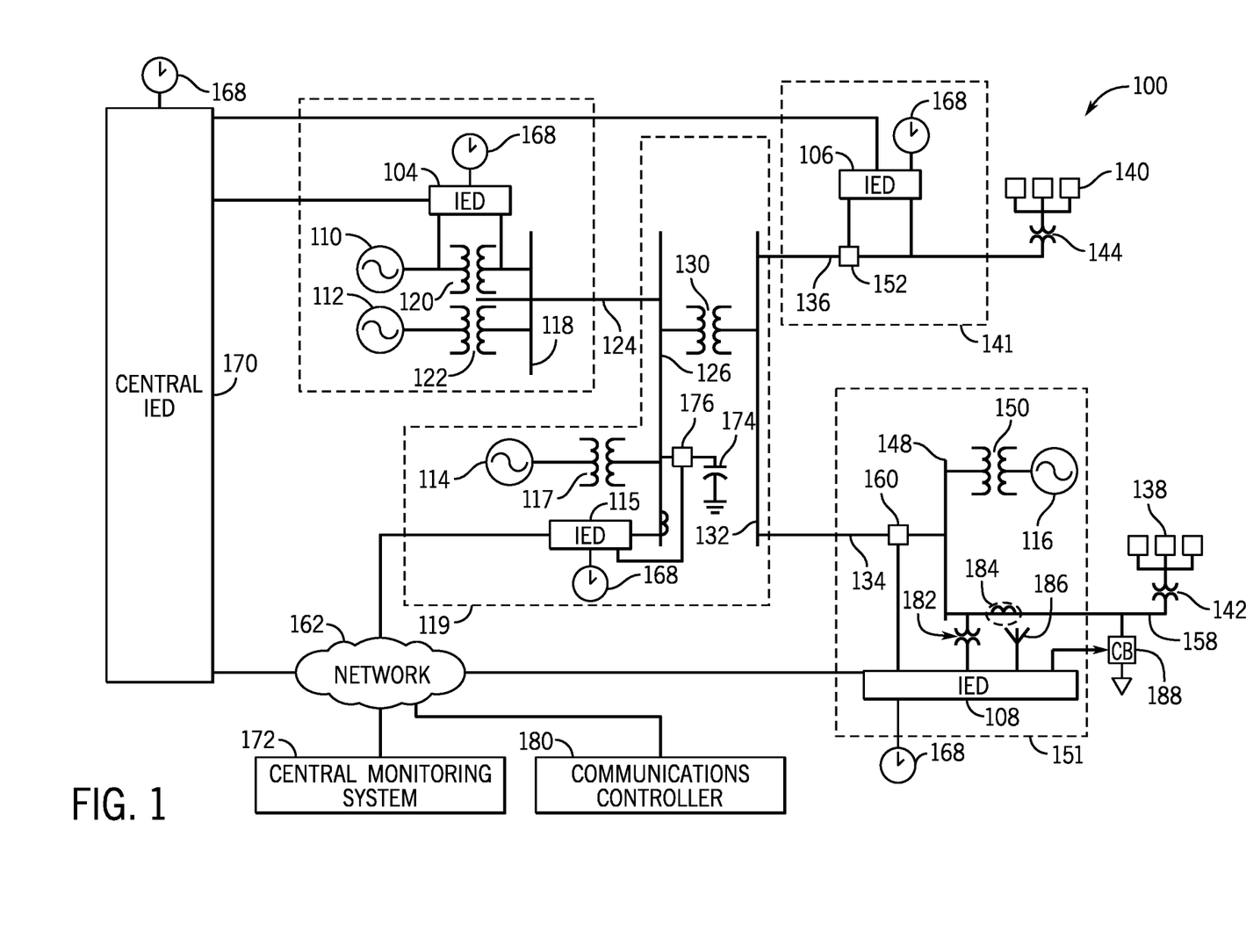
FIG. 1 is a schematic diagram of an electric power delivery system, in accordance with an embodiment.

FIG. 1 illustrates a simplified diagram of an electric power delivery system 100, in accordance with an embodiment of the present disclosure. The electric power delivery system 100 may generate, transmit, and/or distribute electric energy to one or more loads. As illustrated, the electric power delivery system 100 includes electric generators 110, 112, 114, and 116. The electric power delivery system 100 may also include power transformers 117, 120, 122, 130, 142, 144, and 150. Furthermore, the electric power delivery system may include lines 124, 134, 136, and 158 to transmit and/or deliver power. Circuit breakers 152, 160, and 176 may be used control flow of power in the electric power delivery system 100. Busses 118, 126, 132, and 148 and/or loads 138 and 140 receive the power in and/or from (e.g., output by) the electric power delivery system 100. A variety of other types of equipment may also be included in electric power delivery system 100, such as current sensors (e.g., wireless current sensor (WCS) 184), potential transformers (e.g., potential transformer 182), voltage regulators, capacitors (e.g., capacitor 174) and/or capacitor banks (e.g., capacitor bank (CB) 188), antennas (e.g., antenna 186), and other suitable types of equipment useful in power generation, transmission, and/or distribution.

A substation 119 may include the electric generator 114, which may be a distributed generator, and which may be connected to the bus 126 through the power transformer 117 (e.g., a step-up transformer). The bus 126 may be connected to a distribution bus 132 via the power transformer 130 (e.g., a step-down transformer). Various distribution lines 136 and 134 may be connected to the distribution bus 132. The distribution line 136 may be connected to a substation 141 where the distribution line 136 is monitored and/or controlled using an intelligent electronic device (IED) 106, which may selectively open and close the circuit breaker 152. A load 140 may be fed from distribution line 136. The power transformer 144 (e.g., a step-down transformer), in communication with the distribution bus 132 via distribution line 136, may be used to step down a voltage for consumption by the load 140.

A distribution line 134 may deliver electric power to a bus 148 of the substation 151. The bus 148 may also receive electric power from a distributed generator 116 via transformer 150. The distribution line 158 may deliver electric power from the bus 148 to a load 138, and may include the power transformer 142 (e.g., a step-down transformer). A circuit breaker 160 may be used to selectively connect the bus 148 to the distribution line 134. The IED 108 may be used to monitor and/or control the circuit breaker 160 as well as the distribution line 158.

The electric power delivery system 100 may be monitored, controlled, automated, and/or protected using IEDs such as the IEDs 104, 106, 108, 115, and 170, and a central monitoring system 172. In general, the IEDs in an electric power generation and transmission system may be used for protection, control, automation, and/or monitoring of equipment in the system. For example, the IEDs may be used to monitor equipment of many types, including electric transmission lines, electric distribution lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

As used herein, an IED (e.g., the IEDs 104, 106, 108, 115, and 170) may refer to any processing-based device that monitors, controls, automates, and/or protects monitored equipment within the electric power delivery system 100. Such devices may include, for example, remote terminal units, merging units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system including multiple IEDs. Moreover, an IED of this disclosure may use a non-transitory computer-readable medium (e.g., memory) that may store instructions that, when executed by a processor of the IED, cause the processor to perform processes or methods disclosed herein. Moreover, the IED may include a wireless communication system to receive and/or transmit wireless messages from a wireless electrical measurement device. The wireless communication system of the IED may be able to communicate with a wireless communication system of the wireless electrical measurement devices, and may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, universal mobile telecommunication system (UMTS), long term evolution (LTE), long term evolution license assisted access (LTE-LAA), fifth-generation (5G) cellular, and/or 5G New Radio (5G NR) cellular). In some cases, the IEDs may be located remote from the respective substation and provide data to the respective substation via a fiber-optic cable.

A common time signal may be distributed throughout the electric power delivery system 100. Utilizing a common time source 168 may ensure that IEDs have a synchronized time signal that can be used to generate time synchronized data, such as synchrophasors. In various embodiments, the IEDs 104, 106, 108, 115, and 170 may be coupled to a common time source(s) 168 and receive a common time signal. The common time signal may be distributed in the electric power delivery system 100 using a communications network 162 and/or using a common time source 168, such as a Global Navigation Satellite System ("GNSS"), or the like.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. Additionally or alternatively, the central monitoring system 172 may include an intrusion detection system and/or intrusion response system that may receive data (e.g., notifications, data packets, messages, and the like) from any of the IEDs 104, 106, 108, 115 and central IED 170 and may process and/or troubleshoot the received data to determine a cause of a cybersecurity event or network abnormality. A central IED 170 may be in communication with the IEDs 104, 106, 108, and 115. The IEDs 104, 106, 108 and 115 may be located remote from the central IED 170, and may communicate over various media such as a direct communication from IED 106 or over the communications network 162. According to various embodiments, some IEDs may be in direct communication with other IEDs. For example, the IED 104 may be in direct communication with the central IED 170. Additionally or alternatively, some IEDs may be in communication via the communications network 162. For example, the IED 108 may be in communication with the central IED 170 via the communications network 162. In some embodiments, an IED may refer to a relay, a merging unit, or the like.

Communication via the communications network 162 may be facilitated by networking devices including, but not limited to, multiplexers, routers, hubs, gateways, firewalls, and/or switches. In some embodiments, the IEDs and the network devices may include physically distinct devices. In certain embodiments, the IEDs and/or the network devices may be composite devices that may be configured in a variety of ways to perform overlapping functions. The IEDs and the network devices may include multi-function hardware (e.g., processors, computer-readable storage media, communications interfaces, etc.) that may be utilized to perform a variety of tasks that pertain to network communications and/or to operation of equipment within the electric power delivery system 100.

A communications controller 180 may interface with equipment in the communications network 162 to create a software-defined network (SDN) that facilitates communication between the IEDs 104, 106, 108, 115, and 170 and the central monitoring system 172. In various embodiments, the communications controller 180 may interface with a control plane (not shown) in the communications network 162. Using the control plane, the communications controller 180 may direct the flow of data within the communications network 162.

The communications controller 180 may receive information from multiple devices in the communications network 162 regarding transmission of data. In embodiments in which the communications network 162 includes fiber optic communication links, the data collected by the communications controller 180 may include reflection characteristics, attenuation characteristics, signal-to-noise ratio characteristics, harmonic characteristics, packet loss statics, and the like. In embodiments in which the communications network 162 includes electrical communication links, the data collected by the communications controller 180 may include voltage measurements, signal-to-noise ratio characteristics, packet loss statics, and the like. In some embodiments, the communications network 162 may include both electrical and optical transmission media. The information collected by the communications controller 180 may be used to assess a likelihood of a failure, to generate information about precursors to a failure, and to identify a root cause of a failure. The communications controller 180 may associate information regarding a status of various communication devices and communication links to assess a likelihood of a failure. Such associations may be utilized to generate information about the precursors to a failure and/or to identify root cause(s) of a failure consistent with embodiments of the present disclosure.

Embodiments presented herein may monitor communications of one or more of the LEDs 104, 106, 108, 115, 170 and, in particular, monitor data packets received at and/or transmitted from one or more of the LEDs 104, 106, 108, 115, 170. Such monitoring may determine an occurrence of a security event, communications stresses, and/or the like.

Figure 2:
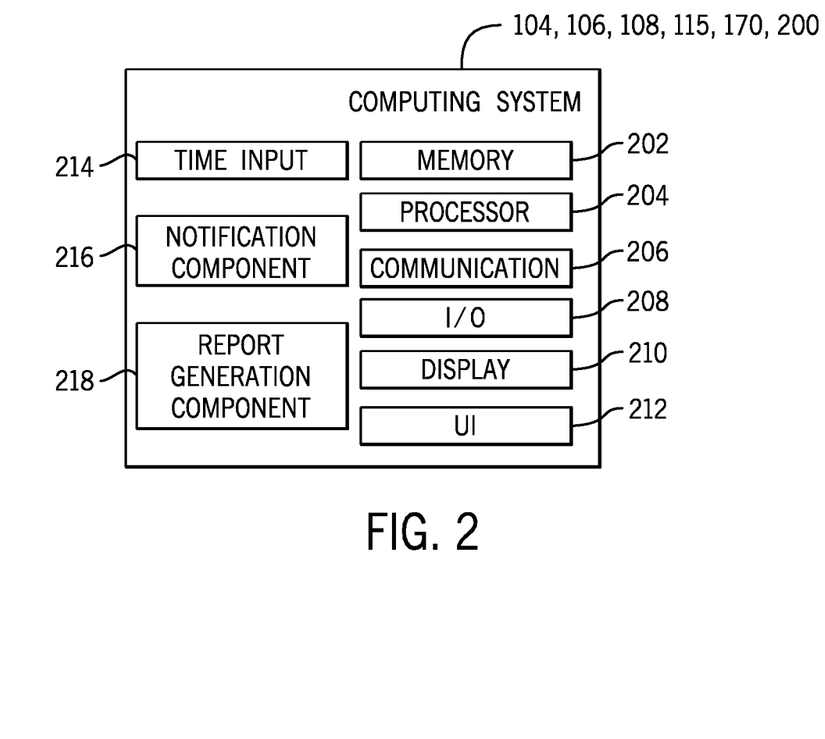
FIG. 2 is a block diagram of a computing system that may be incorporated in a device of the electric power delivery system of FIG. 1, in accordance with an embodiment.

FIG. 2 is a schematic diagram of an embodiment of a computing system 200 that may be incorporated within a device of the electric power delivery system 100, such as in any of the LEDs 104, 106, 108, 115, the central IED 170, the central monitoring system 172, and/or the communications controller 180. The computing system 200 may include a memory 202 and a processor or processing circuitry 204. The memory 202 may include a non-transitory computer-readable medium that may store instructions that, when executed by the processor 204, may cause the processor 204 to perform various methods described herein. To this end, the processor 204 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 204 may, in some embodiments, include multiple processors.

The memory 202 may store a set of threshold communication parameters associated with the computing system 200. For example, a user may input one or more threshold communication parameters via a user interface 212. Additionally or alternatively, the computing system 200 may utilize machine learning to calculate and/or determine one or more threshold communication parameters. A machine learning model may analyze communications and/or communication parameters to determine the threshold communication parameters. The machine learning model may be trained based on training data including past threshold communication parameters, past communication parameters associated with cybersecurity events, past usage, past bandwidth, past utilization rates, and the like. For example, the machine learning model may determine a bandwidth threshold based on any number of previous cybersecurity events. The machine learning model may select and/or average any number of bandwidths associated with the previous cybersecurity events. Additionally or alternatively, the machine learning model may be trained based on training data input by a user. For example, the user may input any number of threshold communication parameters. Additionally, the machine learning model may utilize previous inputs of threshold communication parameters as training data. In some embodiments, the computing system 200 may receive an input to begin training and/or determining any number of threshold communication parameters. The computing system 200 may train the machine learning model using training data collected by the computing system 200. As such, the machine learning model may utilize historical information associated with cybersecurity events to determine and/or update the threshold communication parameters.

In certain embodiments, the set of threshold communication parameters may include threshold values associated with communications of the computing system 200. For example, a bandwidth threshold may specify a threshold value of data in bits per second received by the computing system 200. Additionally or alternatively, the threshold may include a number of frames and/or a number of data packets per second. The bandwidth data may include all data or any portion thereof received by the computing system 200. As another example, a throughput threshold may specify a threshold value of data in bits per second processed by the processor 204 of the computing system 200. Additionally or alternatively, the threshold may include a number of frames and/or a number of data packets per second. In certain embodiments, the throughput data may include data processed by the processor 204 after filtering the bandwidth data. Additionally or alternatively, the set of threshold communication parameters may include a threshold ratio between the bandwidth data and the throughput data. The threshold bandwidth to throughput ratio may include a maximum threshold ratio that defines an upper limit of the ratio between data received by the computing system 200 and data processed by the computing system 200. The set of threshold communication parameters may also include a threshold number of received packets for a given time period. In some embodiments, the set of threshold communication parameters may also include rate of change threshold values. For example, the set of threshold communication parameters may include a bandwidth rate threshold that specifies a rate of change (e.g., maximum, minimum) in bits per second squared for data received by the computing system 200. Additionally or alternatively, the set of threshold communication parameters may include a throughput rate threshold that specifies a rate of change in bits per second squared for data processed by the processor 204 of the computing system 200. The set of threshold communication parameters may also include a ratio rate threshold that specifies a rate of change for the ratio between the bandwidth data and the throughput data.

The LEDs 104, 106, 108, 115 may receive a set of analog quantities (e.g., communication parameters) associated with communications on the network. For example, a user may input the set of analog quantities via the user interface 212. In certain embodiments, the current communication parameters may include a set of analog quantities and/or a set of digital quantities indicative of communications associated with the electric power delivery system 100. For example, the current communication parameters may be based at least in part on a set of data packets communicated via the communications network 162. The set of analog quantities may include the bandwidth received at the respective IED in one or more of the network interfaces of the respective IED. Additionally, the set of analog quantities may include the throughput processed at the respective IED, the utilization percentage of the respective IED, and so forth. In certain embodiments, each IED may include a respective set of communication parameters. Additionally or alternatively, one or more IEDs may include any number of the same communication parameters and/or different communication parameters. For example, the IED 104 may include a first communication parameter, a second communication parameter, and a third communication parameter and the IED 108 may include the first communication parameter and the third communication parameter. Additionally or alternatively, the first communication parameter may have a first threshold value at IED 104 and the first communication parameter may have a second threshold value at IED 108. As such, the number of communication parameters and the threshold values of the communication parameters may differ between LEDs 104, 106, 108, 115 and central IED 170. Furthermore, LEDs 104, 106, 108, 115 and/or the central IED 170 may include any number of the same communication parameters and/or any number of the same threshold values.

The computing system 200 may also include a communication system 206, which may include a wireless and/or wired communication component to establish a communication link with another device of the electric power delivery system 100. That is, the communication system 206 enables the computing system 200 (e.g., of one of the LEDs 104, 106, 108, 115) to communicate with another communication system 206 of another computing system 200 (e.g., of the central IED 170). Indeed, the communication system 206 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 206 may also include a network interface to enable communication via various protocols such as EtherNet/IP®, ControlNet®, DeviceNet®, or any other industrial communication network protocol. The computing system 200 may be subject to fault or failure for various reasons. For example, the computing system 200 may undergo security attacks when the communication system 206 is breached. The communication system 206 may fail when traffic thereon slows communication between the IEDs and/or when certain communications devices fail. The communication system 206 may receive data packets via the communication network 162. In certain embodiments, the communication system 206 may include a monitoring system to monitor communications (e.g., data packets, messages, and so forth) received by and/or transmitted by the computing system 200. Additionally, one or more of the IEDs 104, 108, 115, 170 may be an endpoint of the communication network 162.

In certain embodiments, the processor 204 may analyze and/or process communications received by the communication system 206 and may determine and/or identify abnormal network conditions. For example, the processor 204 may compare analog quantities (e.g., current communication parameters) and threshold communication parameters to identify abnormal network conditions. For example, the processor 204 may determine a number of data packets received meets or exceeds a threshold number of packets in a given time period. As such, the processor 204 may generate and/or transmit a signal indicative of the determination and/or the comparison.

Additionally, the computing system 200 may include input/output (I/O) ports 208 that may be used for communicatively coupling the computing system 200 to an external device. For example, the I/O ports 208 of the computing system 200 of the central IED 170 may communicatively couple to corresponding I/O ports 208 of the computing system 200 of the central monitoring system 172. In certain embodiments, the I/O ports 208 may communicatively couple the computing system 200 to other peripheral components, such as an input device (e.g., keyboard, mouse, and the like). For example, the I/O ports 208 may provide a wired coupling between the computing system 200 and the central monitoring system 172. For example, the computing system 200 of the central IED 170 may transmit a signal to corresponding I/O ports 208 of the computing system 200 that may be wired to the external device via the I/O ports 208 of another IED. Additionally or alternatively, the I/O ports may provide a wireless coupling between the computing system 200 and the central monitoring system 172. As such, the computing system 200 may receive any number of inputs from the input device via the I/O ports 208. In certain embodiments, the computing system 200 may receive any number of inputs indicative of a set of communication parameters. For example, the computing system 200 may receive any number of threshold values input by an operator using the input device. In certain embodiments, the computing system 200 may store and/or update the set of communication parameters in the memory 202 based on the received input. One of the features of this disclosure is the ability to send a notification to other LEDs through a secondary communication path, such as hardwiring (e.g., copper wiring) of a wired communication path or an auxiliary network (e.g., a separate wireless or wired network), in case the primary network is unresponsive or not available due to an abnormality.

Additionally or alternatively, the set of communication parameters may include a threshold bandwidth utilization for one or more I/O ports 208 and/or a threshold total bandwidth utilization for the computing system 200. Bandwidth utilization may specify a percentage of maximum bandwidth currently used by one or more I/O ports 208. The threshold bandwidth utilizations may specify a maximum percentage (e.g., 50%, 75%, 85%, and so forth) for bandwidth For example, one or more of the I/O ports 208 may have a maximum bandwidth of 10 Megabits per second or more (e.g., 20 Mbps, 50 Mbps, 100 Mbps, and so forth). In some embodiments, each I/O port 208 may have the same maximum bandwidth. Alternatively, the I/O ports 208 may have various maximum bandwidths. In certain embodiments, the maximum bandwidths for the I/O ports 208 may be stored in the memory 202. The processor 204 may determine a current utilization for a corresponding I/O port based on the maximum bandwidth. For example, a first I/O port 208 may include a maximum bandwidth of 100 Mbps. The processor 204 may determine a current bandwidth of the first I/O port 208 is 30 Mbps. The processor 204 may retrieve and/or receive the maximum bandwidth for the first I/O port 208 and determine the bandwidth utilization based on a comparison between the current bandwidth and the maximum bandwidth. As such, the processor 204 may determine the bandwidth utilization for the first I/O port 208 is 30%. In certain embodiments, the processor 204 may compare the bandwidth utilization to the threshold bandwidth utilization. Accordingly, the processor 204 may determine the current bandwidth utilization meets or exceeds the threshold bandwidth utilization.

In some embodiments, the computing system 200 may record and/or store a set of data packets associated with an identified cybersecurity attack and/or network abnormality. For example, the processor 204 may identify a network abnormality based on one or more analog quantities (e.g., current communication parameters) exceeding the threshold communication parameters. The processor 204 may identify one or more data packets associated with the analog quantities. For example, the processor 204 may identify a set of data packets received within a specified time frame of the identified network abnormality.

The computing system 200 may further include a display 210 that may present any suitable image data or visualization. Indeed, the display 210 may present image data that includes various information regarding the electric power delivery system 100, thereby enabling the user to observe an operation, a status, a parameter, other suitable information, or any combination thereof, of the electric power delivery system 100. Further still, the computing system 200 may include a user interface (UI) 212 with which the user may interact to control an operation of the computing system 200. For instance, the UI 212 may include a touch screen (e.g., as a part of the display 210), an eye-tracking sensor, a gesture (e.g., hand) tracking sensor, a joystick or physical controller, a button, a knob, a switch, a dial, a trackpad, a mouse, a keyboard, another component, or any combination thereof. Accordingly, the computing system 200 may receive any number of inputs via the UI 212. For example, the computing system may receive input(s) indicative of the set of communication parameters via the UI 212. As another example, the user may utilize the UI 212 of the computing system 200 of the central monitoring system 172 to transmit data to the central IED 170.

The computing system 200 may further include a time input 214, which may be used to receive a time signal (e.g., a synchronized time signal) allowing the computing system 200 to apply a timestamp to received data. In certain embodiments, the time signal may be received via the communications system 206 from the common time source 168, and accordingly, a separate time input may be omitted. Additionally or alternatively, the time input 214 may generate a timestamp based on the occurrence of an identified network abnormality. For example, the processor 204 may generate and/or transmit a signal indicative of an identified network abnormality to the time input 214. The time input 214 may generate a timestamp associated with the identified network abnormality. In certain embodiments, the timestamp may be indicative of the identification of the network abnormality. For example, the processor 204 may identify a set of data packets received within a specified time frame of an identified network abnormality based on the respective timestamps. The processor 204 may record and/or store the set of data packets and/or may transmit the set of data packets for further processing by, for example, the central monitoring system 172.

A notification component 216 may generate a notification of a departure from normal parameters. For example, the notification component 216 may receive a signal from the processor 204 based on one or more current communication parameters meeting or exceeding the threshold communication parameters. The notification component 216 may generate the notification based on the signal, the current communication parameters, the threshold communication parameters, and the like. The notification may alert an operator of the computing system 200 to potential issues so that the operator can take appropriate action. In certain embodiments, the notification may include information associated with a detected event, such as a cybersecurity attack and/or network abnormality. The notification may take a variety of forms and may be customized by a user to provide various levels of notification. In various embodiments, the notification may include an email message, a short message system (SMS) text message, a notification by phone, or the like. In certain embodiments, the notification may include a relay word bit (RWB) that may be transmitted to other devices within the communication network 162. Additionally or alternatively, the computing system 200 may transmit the notification to the central monitoring system 172 (e.g., SCADA system). For example, the computing system 200 may be communicatively coupled to the central monitoring system 172 via a wired and/or a wireless connection. The central monitoring system 172 may receive the notification and may change one or more operating parameters of the IEDs 104, 106, 108, 115. In certain embodiments, the notification component 216 may transmit one or more data packets associated with a cybersecurity attack and/or network abnormality for analysis by the central monitoring system 172. Additionally or alternatively, the computing system 200 may transmit the notification to trigger a network monitoring component, such as the central monitoring system 172, to record and/or store data packets transmitted via the communication network 162. As such, the notification component 216 may facilitate monitoring of the communication network 162 by providing real-time notifications associated with cybersecurity attacks and/or network abnormalities. In some embodiments, the notification may trigger the central monitoring system 172 to adjust operational parameters associated with one or more of the IEDS 104, 106, 108, 115 and central IED 170. For example, the central monitoring system 172 may receive the notification and may determine the network abnormality is not indicative of a cybersecurity attack. As such, the central monitoring system 172 may determine one or more of the threshold communication parameters may be adjusted based on the network abnormality not being indicative of a cyber security attack. Accordingly, the central monitoring system 172 may transmit a signal to one or more of the LEDs 104, 106, 108, 115 and/or central IED 170 to adjust one or more of the set of threshold communication parameters. Additionally or alternatively, the central monitoring system 172 may receive and/or identify network abnormalities that may not be detected by the LEDs 104, 106, 108, 115 and/or central IED 170. As such, the central monitoring system 172 may adjust one or more of the set of threshold communication parameters A report generation component 218 may generate a report including information regarding the network abnormality and how the network abnormality was detected. The report may include a variety of information relating to the status of various communication devices and communication links. The information in the report may be used to perform a root cause analysis.

The embodiments described herein may be useful for different monitoring applications. Additionally, the computing system 200 may be used to detect a cyber-attack by passively monitoring the communications network 162. As previously noted, a monitoring system, such as central monitoring system 172, may also monitor communications of the electric power delivery system 100 to determine a status of the communications network 162. Such monitoring may determine an occurrence of a security event, communications stresses, and/or the like. The central monitoring system 172 may be communicatively coupled to the computing system 200 and may receive notifications and/or signals indicative of an alert or network abnormality detected by the computing system 200. The central monitoring system 172 may store and/or record information associated with the network abnormality based at least in part on the notification or signal. For example, the central monitoring system 172 may store a device ID (e.g., model number, model name, serial number, and any other suitable unique ID) associated with the network abnormality, a time stamp, and so forth. The central monitoring system 172 may also begin any number of procedures to assess the network abnormality and/or address the network abnormality. For example, the central monitoring system 172 may perform a network diagnosis procedure to identify a network error, a maintenance procedure to address the network abnormality, a notification procedure to alert an operator of the network abnormality, a cybersecurity event procedure to identify or address a cybersecurity attack, and the like.

Although the foregoing discusses using thresholds to determine whether the communications network 162 is operating within expected bounds, some embodiments may use machine learning in addition to or alternative to the thresholds previously discussed. Using machine learning, a baseline may be modeled and used to detect baseline changes or related malicious actions using changes to network parameters. In certain embodiments, a machine learning model may be trained using training data associated with cybersecurity events. The IEDs 104, 106, 108, 115, 170 may be subscribed to one or more equipment within the electric power delivery system 100 to receive messages, such as GOOSE messages, sampled value messages, and the like. The training data may also include a threshold bandwidth based on a number of device subscriptions. For example, the machine learning model may determine a maximum bandwidth based on the number of device subscriptions.

Figure 3:
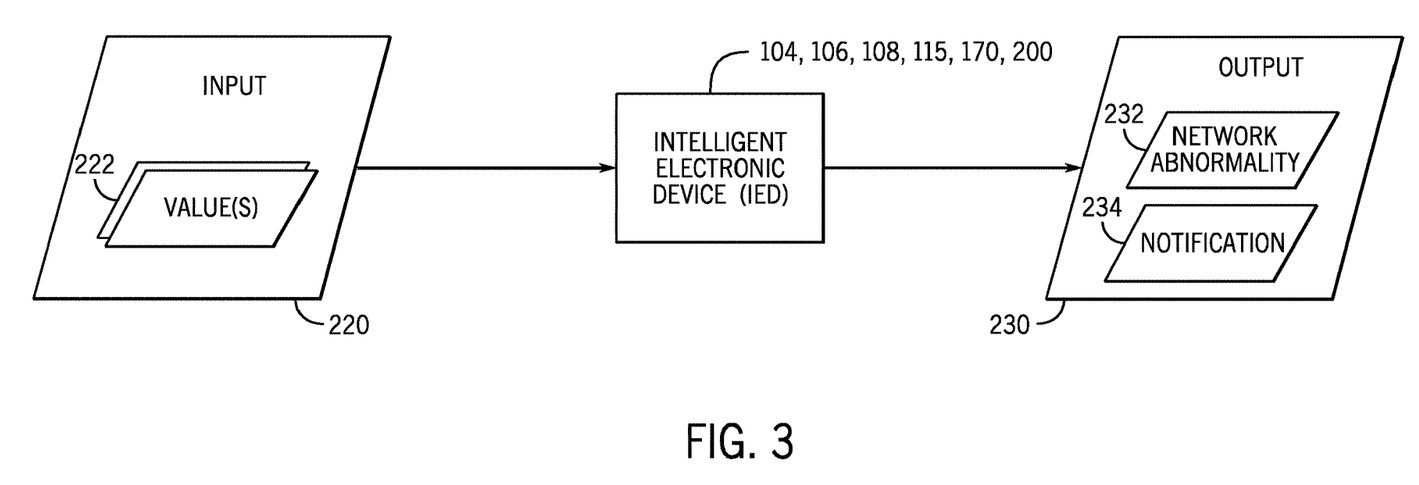
FIG. 3 is a block diagram of an intelligent electronic device of the electric power delivery system of FIG. 1, in accordance with an embodiment.

FIG. 3 illustrates a block diagram of an example IED 104, 106, 108, 115, 170 and/or the computing system 200 of the electric power delivery system 100. The ZEDS 104, 106, 108, 115, 170 may utilize the communication network 162 to receive data (e.g., electrical measurements, packets, messages, notifications, and so forth) as input 220 from monitored equipment in the electric power delivery system 100. In certain embodiments, the IEDs 104, 106, 108, 115, 170 may receive and/or generate sampled values 222 (e.g., analog measurements, analog quantities) from various equipment within the electric power delivery system, such as electric transmission lines, electric distribution lines, current sensors, busses, switches, circuit breakers, reclosers, transformers, autotransformers, tap changers, voltage regulators, capacitor banks, generators, motors, pumps, compressors, valves, and a variety of other suitable types of monitored equipment. The IEDs 104, 106, 108, 115, 170 may also monitor the communications network 162 by analyzing the data received by the IEDs 104, 106, 108, 115, 170 and comparing against threshold communication parameters, as described herein. The IEDs 104, 106, 108, 115, 170 may monitor network traffic (e.g., bandwidth, throughput, and so forth) based on the received data and may generate output 230 based on the network traffic and comparisons. For example, the IEDs 104, 106, 108, 115, 170 may identify a network abnormality 232 based at least in part on the current communication parameters and the threshold communication parameters. Additionally or alternatively, the IEDs 104, 106, 108, 115, 170 may also generate a notification 234 associated with the network abnormality 232. The IEDs 104, 106, 108, 115, 170 may also present information associated with the network abnormality 232 and/or at least a portion of the notification 234 on the display 210. As such, the IEDs 104, 106, 108, 115, 170 may detect and/or identify the network abnormality 232 and may alert an operator of an occurrence of the network abnormality 232.

The IEDs 104, 106, 108, 115, 170 may also utilize the communication network 162 to receive and/or transmit data to the central monitoring system 172, such as a SCADA system. For example, the IEDs 104, 106, 108, 115, 170 may transmit a signal indicative of the network abnormality 232 to the central monitoring system 172. The central monitoring system 172 may also receive the notification 234 and may display at least a portion of the notification to alert an operator of the network abnormality 232. For example, the central monitoring system 172 may present various information associated with the network abnormality 232 including a time stamp associated with detection of the network abnormality 232, one or more IEDs associated with the network abnormality 232, one or more monitored equipment components of the electric power delivery system associated with the network abnormality 232, and the like. As such, the IEDs 104, 106, 108, 115, 170 may detect and monitor for network abnormalities based on communications received at the IEDs 104, 106, 108, 115, 170 and may alert the central monitoring system 172 of any detected network abnormality 232.

Figure 4:
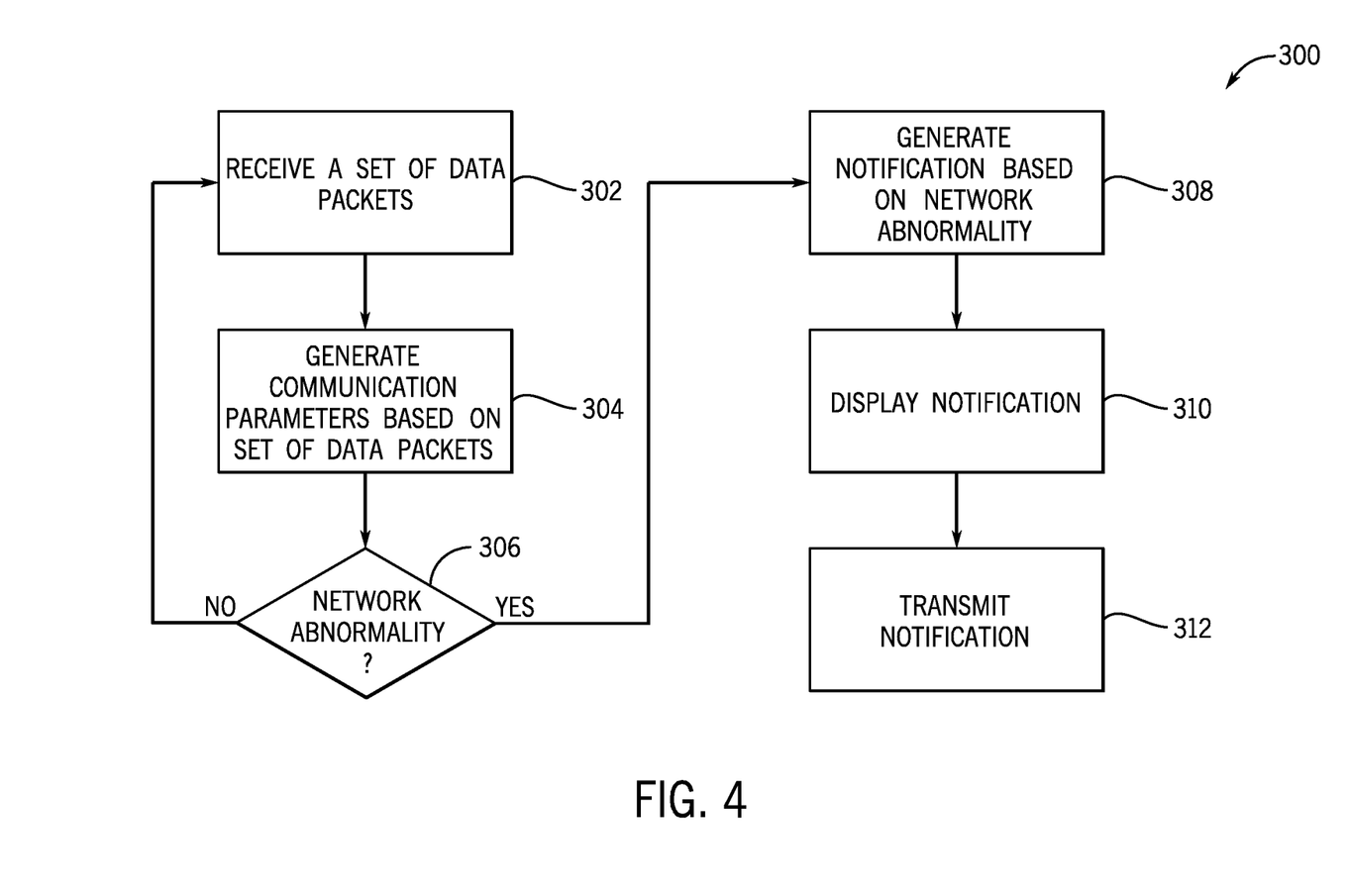
FIG. 4 is a flowchart of a process for monitoring communications received by the computing system of FIG. 2, in accordance with an embodiment.

FIG. 4 described below illustrates a respective process for monitoring communications received at an IED, such as IEDs 104, 106, 108, 115, and 170. Any suitable device (e.g., a controller) that may receive and process communications, such as the processor 204, the communications system 206, or the computing system 200, may perform the process. In some embodiments, the process may be implemented by executing instructions stored in a tangible, non-transitory, computer-readable medium, such as the memory 202, using the processor 204. For example, the process may be performed at least in part by one or more software components, such as an operating system of the computing system 200, one or more software applications of the computing system 200, and the like. While the process is described using steps in a specific sequence, additional steps may be performed, the described steps may be performed in different sequences than the sequence illustrated, and certain described steps may be skipped or not performed altogether. Further still, the steps of the process may be performed in parallel with one another, such as at the same time, and/or in response to one another.

With the foregoing in mind, FIG. 4 illustrates a flowchart of a process 300 for monitoring communications using a set of threshold communication parameters, in accordance with an embodiment of the present disclosure. At block 302, the computing system 200 may receive a set of data packets. The computing system 200 may receive the set of data packets via the communications system 206. The time input 214 may provide a timestamp for each data packet indicative of a time the computing system 200 received the data packet. In certain embodiments, the time input 214 may append the data packet to include the corresponding timestamp. The communications system 206 may transmit a signal indicative of the set of the data packets to the processor 204. In some embodiments, the processor 204 may store one or more data packets in the memory 202. At block 304, the processor 204 may generate a set of analog quantities (e.g., current communication parameters) based on the set of data packets. For example, the processor 204 may generate a current bandwidth utilization for any number of the I/O ports 208 and/or a total bandwidth utilization for the computing system 200.

At block 306, the processor 204 may determine whether the set of current communication parameters are indicative of one or more network abnormalities. For example, the processor 204 may compare the set of current communication parameters with a stored set of threshold communication parameters. The processor 204 may determine whether a network abnormality has occurred or is occurring based on one or more of the set of current communication parameters meeting or exceeding one or more of the set of threshold communication parameters. In response to one or more of the current communication parameters meeting or exceeding one or more of the set of threshold communication parameters (YES path of block 306), the processor 204 may generate (block 308) a notification based on the network abnormality. In certain embodiments, the notification may include information associated with the identified network abnormality. For example, the notification may include a device identification (e.g., model number, serial number), one or more threshold communication parameters, one or more current communication parameters, one or more data packets, and the like.

At block 310, the processor 204 may cause the display of at least a portion of the notification. In certain embodiments, the processor 204 may present at least a portion of the notification via the electronic display 210. For example, the portion of the notification may include one or more threshold communication parameters and/or one or more current communication parameters. Additionally or alternatively, the notification may include a type (e.g., GOOSE message, broadcast message, multicast message, IP, and the like) of communications associated with the network abnormality. The notification may also include text indicative of an alert or warning associated with the network abnormality. As such, the processor 204 may provide the information to an operator viewing the display 210 to assist the operator in troubleshooting and/or diagnosing the network abnormality.

At block 312, the processor 204 may transmit the notification to, for example, the central monitoring system 172. The central monitoring system 172 may receive the notification and may perform further processing based on the notification. For example, the central monitoring system 172 may identify a device associated with the network abnormality based on the notification (e.g., the device identifier). Additionally or alternatively, the central monitoring system 172 may record and/or store one or more data packets based on the notification. For example, the central monitoring system 172 may receive a notification from the IED 104. The central monitoring system 172 may also record and/or store data packets received from the IED 104 and/or transmitted to the IED 104 based on the notification. In response to none of the current communication parameters meeting or exceeding (e.g., falling below) the threshold communication parameters (NO path of block 306), the processor 204 may return to block 302 to receive additional data packets.

As such, the techniques described herein may be utilized to monitor communication parameters at IEDs for detection and notification of network abnormalities. Accordingly, the IEDs may assist in early detection of cybersecurity attacks and other network abnormalities that may occur and may facilitate troubleshooting of such network events. While the foregoing discussion relates to determining potential attacks for IEDs, the foregoing teachings may be applied to determining an integrity of other communication systems. Indeed, in some embodiments, these techniques may be applied to any communication system. For instance, the techniques may be applied to avionic communication networks, automotive communication networks, military command and control systems, and/or other communication networks/systems.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present invention should, therefore, be determined only by the following claims.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. An intelligent electronic device (IED) for an electric power delivery system configured to communicate with a central monitoring system, the IED comprising:
    a communications system of the IED configured to receive a set of data packets via a communication network of the electric power delivery system; and
    a processor of the IED configured to:
        control operation of a plurality of components of the electric power delivery system;
        determine one or more threshold communication parameters;
        cause a memory of the IED to locally store the one or more threshold communication parameters;
        receive a set of current communication parameters based on the set of data packets;
        identify a network abnormality based on one or more current communication parameters of the set of current communication parameters meeting or exceeding the one or more threshold communication parameters, wherein the one or more threshold communication parameters comprise at least a ratio rate threshold that is associated with a rate of change for a ratio between bandwidth data and throughput data; and
        generate a notification based on the network abnormality.

2. The IED of claim 1, wherein the notification comprises the one or more current communication parameters, the one or more threshold communication parameters, or both.

3. The IED of claim 2, wherein the notification comprises a timestamp, a device identification, or both.

4. The IED of claim 1, comprising an (I/O) port, wherein the set of current communication parameters comprises a bandwidth associated with the I/O port, a bandwidth utilization associated with the I/O port, or both.

5. The IED of claim 1, wherein the one or more threshold communication parameters comprises a threshold bandwidth utilization, a threshold bandwidth, a threshold throughput, a threshold bandwidth to throughput ratio, a threshold bandwidth rate of change, or any combination thereof.

6. The IED of claim 1, wherein the processor is configured to transmit the notification to the central monitoring system.

7. The IED of claim 6, wherein the processor is configured to:
    receive a signal from the central monitoring system based on the notification; and
    adjust a first threshold communication parameter of the one or more threshold communication parameters based on the signal.

8. The IED of claim 6, wherein the notification is configured to cause the central monitoring system to record one or more data packets.

9. The IED of claim 1, wherein the one or more threshold communication parameters comprise at least a bandwidth rate threshold that is associated with a rate of change in bits per second squared for data processed by the processor of the IED.

10. The IED of claim 1, wherein the one or more threshold communication parameters comprise at least a throughput rate threshold that is associated with a rate of change in bits per second squared for data processed by the processor of the IED.

11. The IED of claim 1, wherein the one or more threshold communication parameters comprise a bandwidth threshold and a throughput threshold, wherein each of the bandwidth threshold and the throughput threshold respectively comprise a value in bits per second, a number of frames per second, a number of data packets per second, or any combination thereof.

12. The IED of claim 1, wherein the one or more threshold communication parameters comprise at least a threshold bandwidth utilization associated with a maximum value for bandwidth, and wherein the processor of the IED is configured to:
    determine a current bandwidth utilization based on the maximum value for bandwidth and the set of current communication parameters; and identify the network abnormality based on comparing the current bandwidth utilization to the threshold bandwidth utilization.

13. A method, comprising:
receiving, via a communication system of an intelligent electronic device (IED), a set of data packets from a communications network of an electric power delivery system, wherein the IED is an endpoint device of the communications system;
determining, at a processor of the IED, a set of threshold communication parameters, wherein the set of threshold communication parameters comprise at least a ratio rate threshold that is associated with a rate of change for a ratio between bandwidth data and throughput data;
storing, locally at a memory of the IED, the set of threshold communication parameters;
receiving, at the processor of the IED, a set of current communication parameters based on the set of data packets;
identifying, at the processor of the IED, a network abnormality based on a comparison of the set of current communication parameters and the set of threshold communication parameters;
generating, at the processor of the IED, a notification based on the network abnormality; and
transmitting the notification via the communications system of the IED or a secondary communication path.

14. The method of claim 13, comprising transmitting the notification to a central monitoring system via the communications system.

15. The method of claim 14, comprising:
receiving a signal from the central monitoring system via the communications system; and
adjusting a first threshold communication parameter of the set of threshold communication parameters based on the signal.

16. The method of claim 13, wherein identifying the network abnormality comprises comparing a first analog quantity of the set of current communication parameters with a first threshold communication parameter of the set of threshold communication parameters.

17. The method of claim 16, comprising, based on the first analog quantity meeting or exceeding the first threshold communication parameter, generating the notification.

18. The method of claim 13, comprising presenting at least a portion of the notification via an electronic display of the IED, wherein the portion of the notification comprises a first analog quantity, a first threshold communication parameter, or both.

19. An electric power delivery system, comprising:
a central monitoring system configured to monitor communications within the electric power delivery system; and
an intelligent electronic device (IED) in communication with the central monitoring system, the IED configured to:
control operation of a plurality of components of the electric power delivery system;
receive a set of data packets;
determine a set of current communication parameters based on the set of data packets, wherein the set of current communication parameters comprises bandwidth data and throughput data;
identify a network abnormality based on one or more current communication parameters of the set of current communication parameters meeting or exceeding one or more threshold communication parameters, wherein the one or more threshold communication parameters comprise at least a ratio rate threshold that is associated with a rate of change for a ratio between the bandwidth data and the throughput data;
generate a notification based on the network abnormality; and
transmit the notification to the central monitoring system.

20. The system of claim 19, wherein the central monitoring system configured to:
determine the network abnormality is not indicative of a cybersecurity attack; and
transmit a signal to the IED based on determining the network abnormality is not indicative of the cybersecurity attack.

21. The system of claim 20, wherein the IED is configured to:
receive the signal; and
adjust at least one threshold communication parameter of the one or more threshold communication parameters based on the signal.

22. The system of claim 19, wherein the IED comprises an electronic display and wherein the IED is configured to present the notification via the electronic display.

* * * * *